United States Patent [19]

Urban

[11] Patent Number: 4,534,002

[45] Date of Patent: Aug. 6, 1985

[54] METHOD AND APPARATUS TO OPTIMIZE CUT LENGTHS OF MATERIAL

[75] Inventor: Robert G. Urban, Euclid, Ohio

[73] Assignee: Republic Steel Corporation, Cleveland, Ohio

[21] Appl. No.: 459,181

[22] Filed: Jan. 19, 1983

[51] Int. Cl.³ ............................................. G06F 15/46
[52] U.S. Cl. .................................... 364/475; 83/71; 83/364; 364/148
[58] Field of Search ...................... 364/474, 475, 148; 83/71, 364, 365, 72-74, 287, 288

[56] References Cited

U.S. PATENT DOCUMENTS

| | | | |
|---|---|---|---|
| 2,395,562 | 2/1946 | Mansell | 83/71 |
| 2,958,243 | 11/1960 | Foster | 83/71 |
| 3,058,378 | 10/1962 | Shay | 83/38 |
| 3,170,355 | 2/1965 | Neely, Jr. | 83/362 |
| 3,415,149 | 12/1968 | Ziluberman et al. | 83/364 X |
| 3,466,958 | 9/1969 | Munson | 83/71 |
| 3,552,163 | 1/1971 | Lloyd | 72/14 |
| 3,668,957 | 6/1972 | Nido | 83/71 X |
| 3,841,180 | 10/1974 | Gutibauer et al. | 83/15 |
| 3,941,019 | 3/1976 | Baldwin et al. | 83/71 |
| 4,011,779 | 3/1977 | Berg | 83/71 |
| 4,074,601 | 2/1978 | Warren et al. | 83/425.2 |
| 4,163,321 | 8/1979 | Cunningham | 364/475 X |
| 4,318,321 | 3/1982 | De Mattos | 83/71 |

Primary Examiner—Joseph Ruggiero
Attorney, Agent, or Firm—Watts, Hoffmann, Fisher & Heinke Co.

[57] ABSTRACT

A method and apparatus is disclosed for substantially minimizing or eliminating scrap lenghts of material from being cut from an initial undeterminable length of material. A material is fed toward a cutting device. The material is cut in accordance with an initial cut length schedule that is a value between acceptable customer's limits. The trailing end of the material is monitored and the length of the remaining material is determined. The cut length schedule is then adjusted within the limits in accordance with the determined remaining length to bring the last length of material within the permissible limits or if not possible, then to substantially minimize the scrap cut length of material which falls outside of the limits.

37 Claims, 7 Drawing Figures

METHOD AND APPARATUS TO OPTIMIZE CUT LENGTHS OF MATERIAL

DESCRIPTION

1. Technical Field

The present invention relates to a method and apparatus for optimizing cut lengths of material and is particularly directed to a method and apparatus for eliminating a scrap length end piece, whose length falls outside of predetermined length tolerances, by bringing the length of such piece within predetermined limits or for substantially minimizing the length of a tail-end scrap piece of material.

2. Background Art

There are many processes in industry which require the cutting of individual lengths of material from a supply of indeterminable length. In the steel industry, it is common practice to supply a coil of flat steel which is utilized to make pipe or tubing. The flat steel is continuously fed into a forming mill where it it shaped into a tube or a pipe and is electric-resistance-welded to complete the pipe or tube formation. The weld seam is then annealed along the weld seam.

At a subsequent station, the moving pipe or tube is cut to lengths in accordance with a customer's order. Typically, such an order will specify a length of pipe or tube with plus and minus tolerances. Standard practice has been to cut the pipe or tube into equal lengths equivalent to the upper limit specified by the customer. The last remaining piece of pipe or tube is referred to as the tail end piece. As the coil runs out, it is common for the length of the tail-end piece to be less than the permissible lower limit specified in the customer's order but still be of substantial length. Such a tail end piece would typically be scrapped and is therefore referred to as tail-end scrap. Since the coils of steel vary in length and the length of pipe or tube ordered by customers varies, the resultant length of the tail-end piece will vary. The quantity of tail-end scraps remaining at the end of a working shift can add up to a substantial amount of wasted material.

There have been proposed solutions that attempt to reduce the amount of scrap material remaining after cutting customer's orders from an intermediate amount of material. One solution proposed when extremely wide tolerances are acceptable to a customer calls for making a correction cut of material. If the last piece is greater than the allowable limit, one cut at a length between the acceptable limits is made during a cutting sequence which brings the length of the last cut piece within the wide tolerance. This particular approach, however, does not work in all cases, particularly when a customer's tolerances are fairly small with respect to the overall permissible length.

Another proposed solution attempts to reduce the amount of scrap material by knowing or storing in a memory all the lengths of customer's orders. The length of material to be cut must be initially measured prior to any cutting. The material is then cut into a number of pieces that would best fit an order stored in memory and have the least scrap for that particular measured length. Such an approach is not practical when the material used is on a coil which can be many hundreds of feet long or even bars or billets that are of substantial length that is not conveniently measured.

DISCLOSURE OF THE INVENTION

The invention provides a new and improved method and apparatus that is particularly adapted for use in optimizing the cutting operation of steel tube or pipe to substantially reduce or eliminate tail-end scrap length of material at the end of the material supply. The new method and apparatus in accordance with the present invention is designed to adjust the schedule of cuts to be made after the tail-end of the material is sensed, taking into consideration parameters that may vary during the process. Such adjustments to the schedule optimizes the cutting operation and substantially reduces or eliminates tail-end scrap lengths of material; i.e., lengths not falling within customer-specified limits.

In the preferred embodiment disclosed, the method of the present invention comprises the steps of feeding the material to be cut toward a cutter, establishing an initial schedule of cut lengths for the material between set limits, cutting parts of the material in accordance with the established cut lengths, determining a remaining length of material and adjusting the cut length schedule within the limits, commensurate with the determined remaining length, to substantially minimize or eliminate a tail-end length of material outside of the limits. The process further controls the length of any tail-end so if possible it is at least long enough to be cut from the last usable piece, and not so long that it cannot be automatically handled, considering the structured limitations of the equipment being used.

An apparatus of the present invention includes a material cutter, a feeder for moving the material toward the cutter, a detector for sensing a tail-end of material being moved and cut, and a controller operatively coupled to the cutter and the detector, to cut the material in accordance with an initial schedule of equal determined lengths within predetermined limits, to determine the length of material between the cutter and the tail-end of the material and to then adjust the cut length schedule to provide cuts that produce lengths of material within the limits to substantially minimize or eliminate a tail-end length of material being outside of the limits.

In the preferred embodiment, the material is fed toward a flying cutting carriage. Initial cut length limits are established and the material is cut in accordance with the initial cut schedule to lengths equal to a set upper, but not maximum, limit. The material being fed toward the flying cutting carriage is monitored to detect the tail-end of the material by using a tail-end detector. The length of material from the blades of the flying cutting carriage to the tail-end of the material is measured. A cut length adjustment is calculated within the upper and lower limits. The schedule is then adjusted in accordance with the calculated cut length adjustment to substantially minimize or eliminate the scrap length.

Another feature of the present invention is the monitoring of the actual length of the material cut and then recalculating further cut schedules within said limits in accordance with the actual cut lengths. This provision accounts for system errors or material slippage during the entire operation. Such occurrences are likely because the line length from the feed station to the cutting station is quite long, and may typically be approximately 500 feet. Because the upper and lower length limits used for the schedule are conservative, i.e., are not the maximum and minimum specified by the customer, such system errors or slippage do not typically resut in scrap.

Another feature of the present invention is the provision that if the tail-end scrap length cannot be eliminated, the last cut is made to leave the last length of material within other limits to satisfy system constraints, such as handling capabilities.

Other features and advantages and a fuller understanding of the invention will be had from the following detailed description and the accompanying drawings.

BEST MODE FOR CARRYING OUT THE INVENTION

Figure 1:
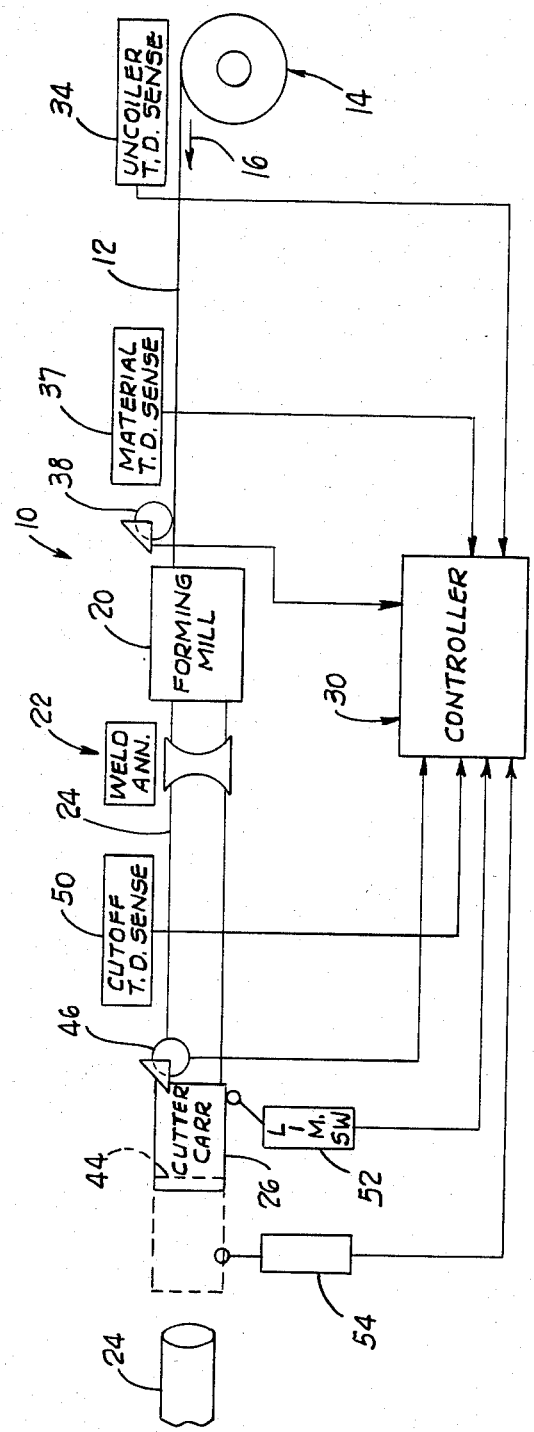
FIG. 1 is a diagrammatical representation of an apparatus made in accordance with the present invention.

Referring to the drawings, an optimization system 10 is shown for substantially reducing or minimizing the amount of scrap material cut from a supply of material of indeterminate length or for completely eliminating a scrap length of material. The preferred system is shown in connection with apparatus for forming steel pipe from flat coiled steel. As shown in FIG. 1, flat steel 12 is supplied in the form of a coil 14. The coil is unrolled using an uncoiler machine, not shown, and the flat steel is fed as a continuous strip into the system along a straight workpath in the direction of the arrow 16. The steel is fed lengthwise into a forming mill 20 where it is continuously formed into a cylindrical pipe or tube shape.

A welder and localized annealer 22 welds the seam of the pipe and locally anneals the seam. The welded pipe 24 procedes along the workpath toward a flying cutter carriage 26 that is controlled by a controller 30 to cut the pipe into desired lengths. The system 10 controls the cutting of the pipe 24 so that the resultant lengths remain within limits, e.g., those specified by a customer's order, without leaving a scrap piece of pipe having a length outside of the customer's limits, or so that the length of any scrap piece is substantially minimized.

An uncoiler tail-out sensor 34, such as a proximity switch, is located adjacent the coil of flat steel 14 along the workpath and is operatively connected to the controller 30. The uncoiler tail-out sensor 34 monitors the steel 12 and provides signals to the controller 30 to indicate that the steel 12 is or is not still present in the workpath at the location of the sensor. When the tail-end of the steel 12 leaves the roll 14, this occurrence of so-called "tail-out" is signalled.

A pulse tachometer 38 is positioned along the workpath just upstream of the forming mill 20 and generates pulses with a measuring wheel as the steel 12 passes along the workpath, the number of pulses being a function of the linear movement of the steel. The controller 30 includes a counter 40 (FIG. 2) that counts the pulses from the pulse tachometer 38. The count of the counter can therefore be converted to the number of linear feet that the steel has traveled.

A material position tail-out sensor 37 is located along the workpath just upstream of the tachometer 38. The material position tail-out sensor 37 indicates to the controller 30 that steel is or is not still present at that location along the workpath.

The flying cutter carriage 26 includes rotating cutter blades 44 that cut the pipe transversely. A cut length measuring wheel 46 is carried by the flying cutter carriage and is operatively connected to the controller 30. The cut length measuring wheel 46 includes a tachometer 48 (FIG. 2), which generates pulses to the controller 30 as the pipe 24 travels past its location. The number of pulses generated by the tachometer 48 is a function of the relative linear motion between the pipe 24 and the flying cutter carriage 26. A cut-off tail-out sensor 50 is positioned upstream along the workpath from the flying cutter carriage and is operatively coupled to the controller 30 and provides an indication that the pipe 24 is or is not present at that location along the workpath.

The operation of a flying cutter carriage is known in the art and will not be described herein in detail. Essentially, the flying cutter carriage is adapted to travel with the pipe 24 down the workpath as the rotating cutter blades 44 cut the pipe. Since the pipe can not be instantaneously cut, the flying cutter carriage must travel with and at the same speed as the pipe until the rotating cutter blades 44 have completed their cut. Once the cut has been completed the flying cutter carriage returns to an initial position defined as the home position.

A carriage home limit switch 52 is operatively coupled to the controller 30 and indicates to the controller 30 when the flying cutter carriage 26 is in its home position. A carriage position limit switch 54 is positioned along the workpath downstream with respect to the limit switch 52 and is operatively connected to the controller 30. The limit switch indicates to the controller 30 when the flying cutter carriage 26 has reached that downstream position, which occurs during a cutting operation.

Figure 2:
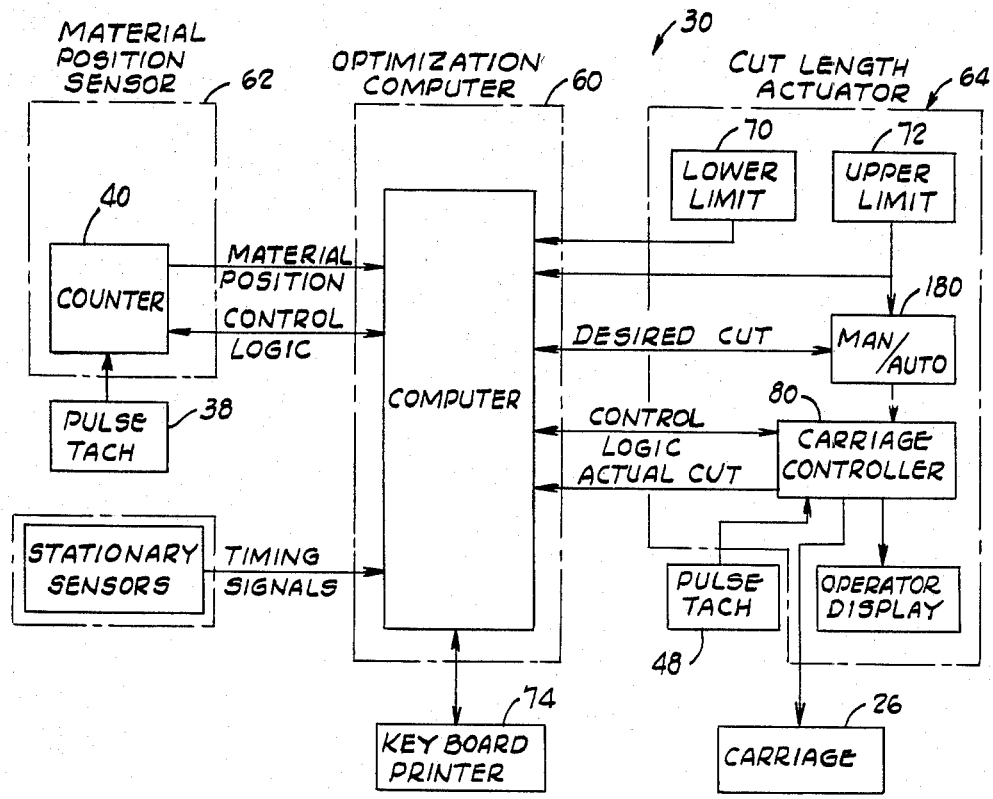
FIG. 2 is a block diagram showing the control system in accordance with the present invention.

The controller 30 and its operation will be better understood with reference to FIG. 2. The controller 30 includes an optimization computer 60, a material position sensor 62 and a cut length actuator/monitor 64.

The pulse tachometer 38 of the material position sensor 36 generates pulses that are counted by a counter 40, which is part of the material position sensor 62. The material position sensor 62 is operatively connected to the optimization computer 60 with the counter 40 being controlled by the computer through control logic. The pipe position data is received by the computer 60 from the counter 40. The computer 60 converts the count indicia from the counter 40 into linear feet of travel that the steel moved along the workpath.

The carriage sensors 52, 54 and the three tail-out sensors 34, 37 and 50 are all stationary sensors and are all operatively connected to the optimization computer 60. Once the steel 12 has tailed-out of the coil 14 and passes the uncoiler tank-out sensor 34, the computer 60 resets the counter 40 to zero. The optimization computer 60 then can determine where the end of the steel is at any given time with respect to any fixed point along the workpath, such as from the position of the sensor 34.

If the flying cutter carriage happened to return to its home position, tripping the limit switch 52, or reached the limit switch position 54 at the exact instant the end of the steel passed the uncoiler tail-out sensor 34, the length of steel remaining between the cutter blades 44 and the end of the steel would be known since the distance between the uncoiler tail-out sensor 34 and the cutting blades in the flying cutter carriage at either the home position or the position at limit switch 54 can be measured and is recorded in the computer. If the flying cutter carriage is not in the home position or at the switch 54 when the tail-end of the steel passes the uncoiler tail-out sensor 34, which is the typical case, the counter 40 will have the indicia of steel length that has traveled passed the sensor 34 when the carriage gets to one of the positions, because the counter was reset to zero by the computer 60 when the steel passed the uncoiler tail-out sensor 34. the remaining length is then determined when the flying cutter carriage contacts the limit switch 54. The length of steel is equal to the distance of the cutter blades when the carriage contact the switch 54 to the uncoiler tail-out sensor, minus the length the steel has traveled along the workpath, which was recorded by the counter 40. If the last few feet of pipe are scrap because of an open weld, such last few feet are accounted for in the calculations.

The cut length actuator 64 includes an entry means by which an operator can set an upper length limit and a lower length limit for permissible cuts of the pipe 24. Typically the upper and lower limits are set conservatively with respect to a customer's order. For example, if an order was for pipe between 43 and 52 feet long (minimum and maximum limits), 45 and 50 feet would be the set lower and upper limits. This usually eliminates scrap that would otherwise result from small cutting errors due to system problems, such as slippage.

The entry means takes the form of thumbwheel switches in the preferred embodiment and are indicated in FIG. 2 as a lower limit block 70 and an upper limit block 72. The lower limit 70 and the upper limit 72 are monitored by the optimization computer 60. The computer sends control information to a carriage controller 80 within the cut length actuator 64, which in turn controls the flying cutter carriage 26.

A keyboard printer 74 is provided so that an operator can enter and receive data into and out from the optimization computer 60. The actual limits of the customer are entered into the optimization computer 60 through the keyboard printer 74 and define a maximum upper and minimum lower limit.

The tachometer 48 of the cut length measuring wheel 46 is operatively connected to the controller 30 through the carriage controller 80 of the cut length actuator 64. The computer 60, through control logic, instructs the carriage controller 80 to cut pipe to a specific length.

Figure 6:
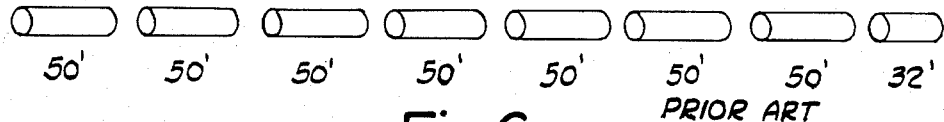
FIG. 6 is a prior art diagrammatical representation of cut lengths of material cut to the upper tolerance with a remaining scrap length.

For comparison, prior art practices can be appreciated by referring to FIG. 6. In accordance with prior art techniques, the control length actuator would cut the pipe 24 to the lengths selected as the upper limit. If 50 foot lengths were indicated, every cut of pipe 24 would be 50 foot lengths. Assuming that the steel coil is 732 feet long, and the lower limit entered is 45 as in the above example, this would yield a tail-end piece of 32 feet, which is less than the lower limit. FIG. 6 shows the last eight cuts in accordance with a prior art practice. Such a tail-end piece would typically be scrapped.

In accordance with the present invention, the pipe 24 is cut to lengths equal to the upper limit until the position of the tail-end of the steel 12 is sensed, after which the computer 60 determines the length of pipe remaining to be cut and readjusts the cut lengths within the set limits such that the length of the tail-end piece will come within the limits, or if scrap length cannot be eliminated, to substantially minimize the length that does remain.

Figure 3:
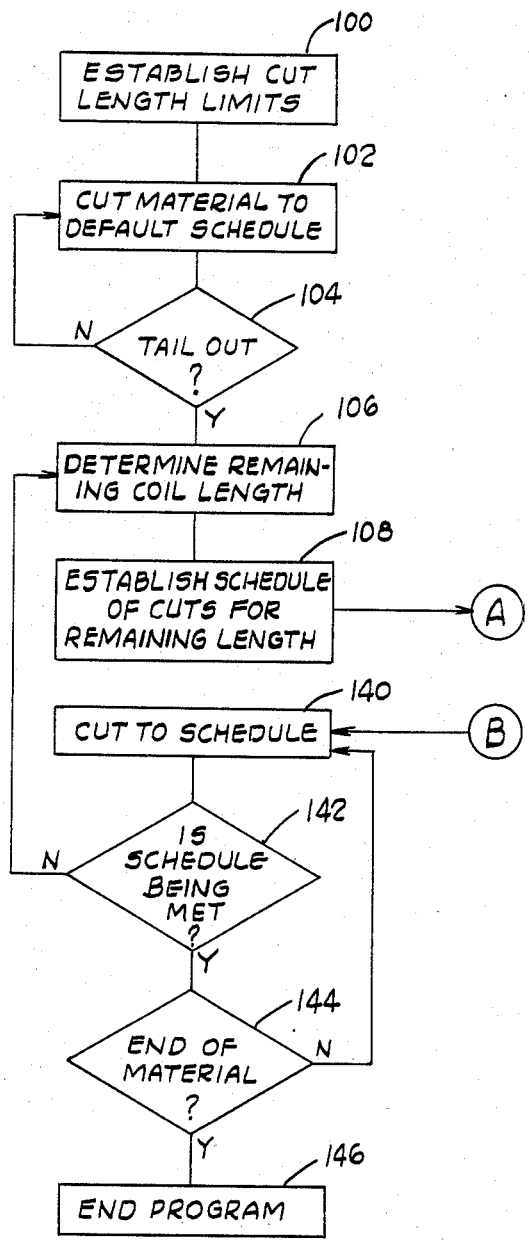
FIG. 3 is a flow chart representation of a method for optimizing a cutting operation in accordance with the present invention.

Referring to FIG. 3, the present invention will be better understood. The first step 100 of the flow diagram is to establish cut length limits in accordance with a customer's order. For example, if a customer's order for pipe is between 43 and 52 feet, lower and upper length limits allowing some error, such as 45 and 50 feet would be set. The next step 102 is to cut the material in accordance with a default schedule. A default schedule is a schedule of cut lengths in which all the lengths are equal and is a value within the established cut length limits. Typically, the default schedule would be the upper limit and in the example would be 50 feet.

The uncoiler tail-out sensor 34 is monitored by the controller in step 104 of the flow chart. If tail-out of the steel has not occurred, the material is continued to be cut in accordance with the default schedule. Once tail-out has occurred, which means that the tail-end of the steel 12 has passed the tail-out sensor 34, the computer determines the remaining length of material in step 106 by calculation. To make this calculation, the computer first resets the counter 40 to zero at tail-out and monitors when the carriage 26 contacts the limit switch 54. The length of material will be equal to the distance between the rotating cutting blades 44 and the uncoiler tail-out sensor 34 when the flying cutter carriage 26 first contacts the limit switch 54 minus the distance the steel has traveled as indicated by the counter 40.

The computer 60 then establishes a new schedule of cut lengths for the remaining length of steel to ensure that the length of the tail-end piece is within the lower and upper limits or if the length can not be brought within such limits, it substantially minimizes the length of a scrap piece whose length is less than the lower limit of the customer's order. This is done in step 108 of the flow diagram.

Figure 4:
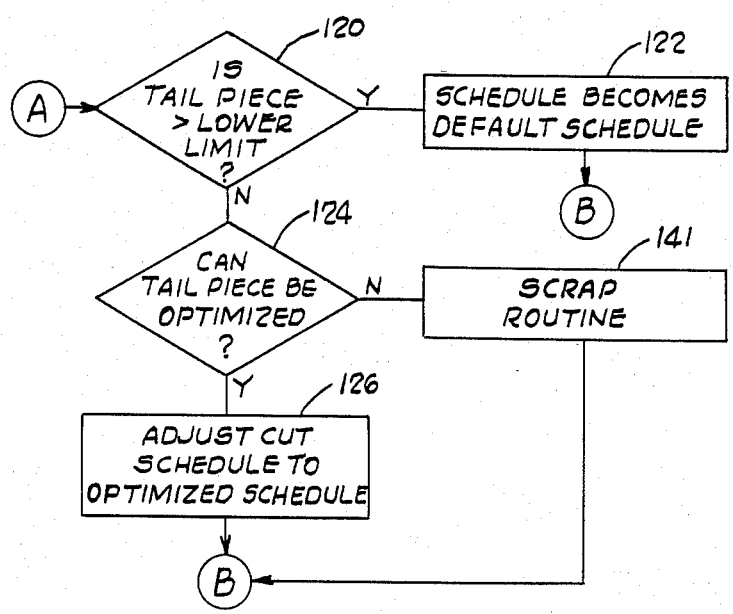
FIG. 4 is a continued flow chart of the flow chart shown of FIG. 3.

Referring now to FIG. 4, the program proceeds from step 108 (FIG. 3) through "A" where it is determined in step 120 whether the length of the tail-end piece of material would be greater than the lower set limit 70. If it is, the remaining cut schedule follows the default schedule (step 122) established in step 102 of the flow diagram in FIG. 3 and the program returns to FIG. 3 through "B". If the tail-end piece is not greater than the lower limit, a determination is made in step 124 whether it is possible to eliminate the scrap length of material at the end. If the computer makes an analysis that it is possible to eliminate a scrap length, in step 126 the cut length schedule is adjusted to an optimized schedule and the program returns to FIG. 3 through "B". The program then proceeds to step 140 (FIG. 3).

If it is determined that the length of the tail-end cannot be brought within the limits, a scrap routine 141 is established.

Figure 7:
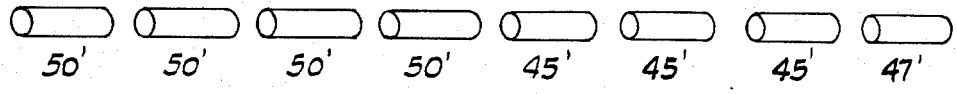
FIG. 7 is a diagramatical representation of cut lengths of material cut in accordance with the present invention in which scrap is eliminated.

There are several algorithms to eliminate scrap length that can be used in step 126. One such algorithm divides the remaining length of material by the upper limit to determine the length of the remaining piece and the number of cuts that can be made at the upper limit. The difference between the set lower and upper limits times the number of possible cuts is equal to the maximum length that can be added to the last piece. In the above example, assume that 482 feet remain after tail-out. 50 divided into 482 is 9 with a remainder of 32. The limit difference is 5 (50 minus 45). A total length of 15 feet can be added to the last length by making 3 cuts at 45 feet. The three pieces prior to the last piece are cut at 45 feet and the remaining piece is 47 feet (32 plus 15). This is shown in FIG. 7.

One particular scrap routine 141 can be used to minimize the scrap length piece of material if it is determined in step 124 that the scrap length cannot be eliminated. Assume an example in which the initial default cut schedule is at the lower limit. If it is determined that a scrap length cannot be eliminated, a cut schedule adjustment would be made to the upper limit which would minimize the remaining scrap length. If the default cut schedule was at some other value between the set limits and if it was determined by the computer that the last length could not be brought within the limits, a similar approach can be used to add material to the lengths remaining to be cut to keep them within the set limits and minimize the remaining scrap length.

Step 140 of the flow diagram is to make the next cut in accordance with the new established schedule of cuts. The computer monitors the cut length measuring wheel to determine, in step 142, whether the new cut length schedule is being met. For example, if the new cut length schedule determined that the next piece should be 45 feet long and because of a slip in the machine or system, it actually is cut to 46 feet in length, a readjustment could be necessary. Because the actual cut length does not fall outside the maximum and minimum limits, for the length, the piece is not scrap. In step 142 a determination is made of whether the program can or cannot still be met based on an accumulation of such deviations from the initial schedule, necessitating a return to step 106 if it cannot. If the program returns to step 106, the remaining length of material is recalculated, correcting for the known error. The cut schedule is then readjusted in step 108. If the schedule is being met, the computer in step 144 monitors the end of the material through the cut-off tail-out sensor 50. If the end of the material has not been reached, the program returns to step 140 to make the next cut in accordance with the established schedule. Each cut length is monitored to assure that the intended length has in fact been cut in accordance with the schedule and if it has not been, the computer, if necessary, will readjust the schedule accordingly to substantially reduce or eliminate a scrap length piece falling outside of a customer's limits. Once the end of the material has been reached, the program ends in step 116.

Figure 5:
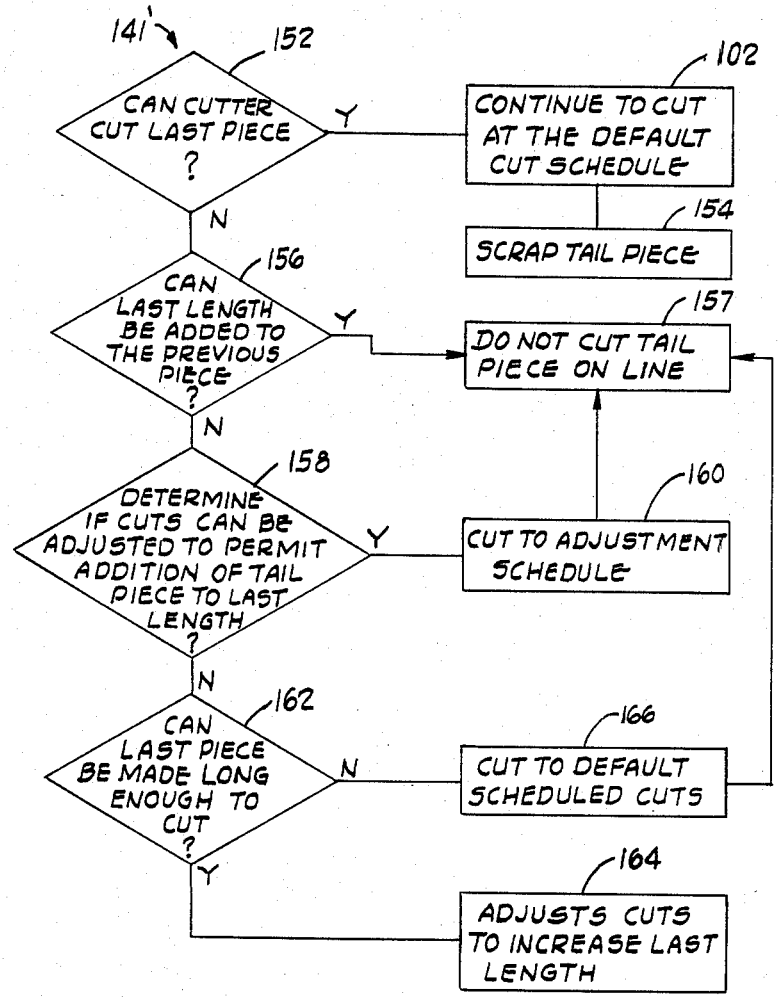
FIG. 5 is a flow chart representation for a scrap subroutine.

Another scrap routine 141' of the present invention is shown in FIG. 5. This scrap routine is used when parameters of a particular facility necessitate that the last piece must be at least a minimum length so that the system line can support the last remaining length of material so it will not fall behind the carriage when cut and necessitate that the material does not exceed another length so that it can be automatically removed from the line.

The scrap routine, shown in FIG. 5, is therefore used only when system constraints make it more important to satisfy system criteria rather than minimize scrap length. One example is where pipe is desired to be cut between 45 and 50 feet and system contraints requires the last piece to be between 25 and 72 feet. For example, in a particular handling system embodying this invention, if the last length to be cut is shorter than 25 feet, the flying cutter cannot make the cut, and if the last piece will be longer than 72 feet, special handling is required to remove it from the workpath. The optimization computer, in a case where the scrap length cannot be eliminated, will minimize the length of the last piece down to a length of 25 feet. If it is determined that the last piece is shorter than 25 feet, the last cut will not be made and adjustments in the cutting schedule will be made to ensure that the last length is shorter than 72 feet. Such a long last length can be subsequently cut off-line to the necessary limits manually.

In step 152 a determination is made whether or not the last piece can be cut. If it can be cut, the default cut schedule is carried out with the program continuing on as shown in FIG. 3 until the last cut has been made. In step 154, the tail-end piece is then scrapped.

If it is determined in step 152 that the last piece cannot be cut because it would leave a piece whose length is below the system minimum, it is determined in step 156 whether adding the scrap piece to the last piece would exceed a permissible system handling length. If the remaining length or scrap piece can be added to the last piece without exceeding the permissible length, then the final cut of the tail-end piece is not made in step 157. If it is determined in step 156 that adding the scrap piece to the last piece would exceed a permissible handling length, a determination is made in step 158 of whether or not cut length adjustments can be made in the schedule that would permit addition of the scrap piece to the last length of pipe to bring it within the handling limits. If so, the cut schedule is again adjusted in step 160 and the program returns to step 140 in FIG. 3, except that the last piece is not cut in step 157.

In the event it is determined that the cut schedule cannot be adjusted in step 158 to bring the last length of pipe plus the scrap length within the upper handling limits, step 162 determines whether, if cut lengths are increased to the maximum upper limit of a customer's order, which data was entered into the computer 60 by the keyboard, it will bring the last length within system limits. If the answer is yes, the adjustment is made in step 164 to make such a cut schedule. The program then returns again to the basic program in step 140 with the new upper limit. If the answer is no in step 162, step 166 reestablishes the original default schedule and the last cut is not made. The material would then have to be handled specially by personnel.

The invention heretofore has been described assuming that the length of material exceeds the line length. It is typical for the line length, that is the distance between the uncoiler tail-out sensor 34 and the flying cutter carriage 26, to be approximately 500 feet. Thus the description has assumed that the length of steel on the roll is greater than 500 feet. Typically the distance between the pipe position tracking wheel of the tachometer 38 and the uncoiler tail-out sensor 34 would be half the line distance or approximately 250 feet in the arrangement described. If the material length is greater than the length between the pipe position tracking wheel of the tachometer 38 and the uncoiler tail-out sensor 34, that is, between 250 and 500 feet, measurement of the remaining length of material is done in a similar manner as heretofore described. In general operation, when the material is first formed into a pipe, the front end is not initially welded. The welding typically begins 5 to 10 feet past the beginning end of the material. In such a case when the material length is between 250 and 500 feet, the measurement is not completed until the front end open weld section is cropped. This is done to avoid confusion with material that may be in the flying cutter carriage from a previous material feed.

If the material length is less than the distance between the pipe position tracking wheel of the tachometer 38 and the uncoiler tail-out sensor 34, that is, less than 250 feet in the arrangement described, tail-out of the uncoiler would occur before the beginning end reaches the pipe position monitor tracking wheel of the tachometer 38. In such a circumstance, the counter 40 is reset and tracking begins when the beginning end of the steel reaches the pipe position tracking wheel. When the tail-end reaches the pipe position tracking wheel of the tachometer 38 the material length is indicated on the counter 40 minus any initial crop cut that is made.

A manual override 180 is provided as part of the cut length actuator 64. This permits the operator to in essence disable the optimization computer 60 from controlling the cut length actuator 64. It is contemplated that, under such conditions, the cut length actuator would then cut all pieces to the upper limit as entered in block 72.

To summarize, the preferred method for reducing end scrap in the successive cutting of the moving pipe 24 to produce pieces of desired length within predetermined lower and higher limits, and where the differences between the limits is small with respect to the lengths being cut, e.g., no greater than one-half the desired length, includes the steps of (a) cutting pieces within said limits from the moving length, (b) sensing a trailing end of the length of material at a known distance from where the material is cut, the distance being at least three times the minimum desired length, and (c) after the trailing end is sensed, controlling when the cuts are made as follows: (i) calculate the number of pieces of a length equal to the higher limit that can be cut and the length of any remaining material forming a last-piece, (ii) if the last-piece is longer than said lower limit, cut the remaining material into pieces of a length equal to the higher limit, (iii) if the last-piece is shorter than said lower limit, calculate whether one or more of the pieces to be cut can be reduced in length from the higher limit but to a length no shorter than the lower limit so said last-piece will be of a length within said limits and if so cut said one or more pieces to said reduced length, (iv) if under the calculation of subparagraph (iii) hereof the last-piece will not fall within said limits, determine if said last-piece is longer than a minimum length that can be cut from the preceding piece and if so cut said one or more of the pieces remaining to be cut to a length equal to the higher limit, and scrap the last-piece, (v) if under the determination of subparagraph (iv) said last-piece is shorter than said minimum length, determine if the sum of the length of the last-piece and said higher limit is less than a maximum length that can be accommodated automatically due to handling constraints and if so do not sever said last-piece, (vi) if said sum is greater than said maximum length, calculate whether cutting said one or more pieces to a length equal to the higher limit will reduce the length of said last-piece to less than said maximum length and if so cut said one or more pieces to the higher limit and do not sever said last-piece, (vii) if the calculation of subparagraph (vi) will not reduce the length of said last-piece to less than said maximum length, calculate whether making the said one or more pieces of a shorter length than the higher limit but at least as large as the lower limit will result in said last piece being between said minimum and maximum lengths and if so cut said one or more pieces to said shorter length, and (viii) if said last-piece is not shorter than said maximum length under the calculation of subparagraph (viii), make said one or more pieces of a length equal to the higher limit, do not sever said last-piece, and remove said last-piece including an attached length equal to the higher limit from handling and cutting apparatus nonautomatically.

Other modifications and variations of the invention will be apparent to those skilled in the art in view of the foregoing detailed disclosure. Therefore, it is to be understood that, within the scope of the appending claims, the invention can be practiced otherwise than as specifically shown and described.

I claim:

1. A method for reducing end scrap in the successive automatic cutting of moving material on automatic cutting and handling apparatus, said material being initially of indeterminate but finite length and said method serving to produce from said material pieces of desired length within predetermined lower and higher limits, the difference between said limits being no greater than one-half the desired length, the steps comprising:

(a) cutting pieces within said limits from the moving length;

(b) sensing a trailing end of the length of material at a known distance from where the material is cut, the distance being at least three times the minimum desired length; and (c) after the trailing end is sensed, controlling when the cuts are made as follows:

(i) calculate the number of pieces of a length equal to the higher limit that can be cut and the length of any remaining material forming a last-piece;

(ii) if the last-piece is longer than said lower limit, cut the remaining material into pieces of a length equal to the higher limit;

(iii) if the last-piece is shorter than said lower limits, calculate whether one or more of the pieces to be cut can be reduced in length from the higher limit but to a length no shorter than the lower limit so said last-piece will be of a length within said limits and if so cut said one or more pieces to said reduced length;

(iv) if under the calculation of subparagraph (iii) hereof the last-piece will not fall within said limits, determine if said last-piece is longer than a minimum length that can be cut from the preceding piece and if so cut said one or more of the pieces remaining to be cut to a length equal to the higher limit, and scrap the last-piece;

(v) if under the determination of subparagraph (iv) said last-piece is shorter than said minimum length, determine if the sum of the length of the last-piece and said higher limit is less than a maximum length that can be accommodated automatically due to handling constraints and if so do not sever said last-piece;

(vi) if said sum is greater than said maximum length, calculate whether cutting said one or more pieces to a length equal to the higher limit will reduce the length of said last-piece to less than said maximum length and if so cut said one of more pieces to the higher limit and do not sever said last-piece;

(vii) if the calculation of subparagraph (vi) will not reduce the length of said last-piece to less than said maximum length, calculate whether making the said one or more pieces of a shorter length than the higher limit but at least as large as the lower limit will result in said last piece being between said minimum and maximum lengths and if so cut said one or more pieces to said shorter length; and (viii) if said last-piece is not shorter than said maximum length under the calculation of subparagraph (viii), make said one or more pieces of a length equal to the higher limit, do not sever said last-piece, and remove said last-piece including an attached length to the higher limit from handling and cutting apparatus nonautomatically.

2. A material cutting method comprising the steps of:
(a) propelling the material relative to and past a cutting apparatus;
(b) actuating the cutting apparatus to cut a first series of sections of said material in accordance with a first cutting schedule, wherein each of said first series of sections cut has a uniform predetermined initial length lying between a first maximum and a first minimum value;
(c) determining the length of a remainder portion of said material yet to be propelled past said cutting apparatus;
(d) calculating the length of a last tail end section of said material remainder, which would result if said remainder portion were to be cut in its entirety according to said first cutting schedule;
(e) in the event that said calculation of step (d) indicates that said tail end section length will be greater than said first minimum value, cutting said remainder portion in its entirety in accordance with said first cutting schedule;
(f) in the event that the calculation of step (d) indicates that said tail end section length would be less than said minimum value, calculating whether cutting a plurality of sections of said remainder portion in accordance with a second cutting schedule, wherein said plurality of sections are each cut shorter than said initial predetermined length but at least equal to said first minimum value, will leave sufficient additional material on said tail end length such that said tail end length will at least equal said first minimum value;
(g) in the event that the calculation of step (f) indicates that sufficient additional material will be left on said tail end section by execution of said second cutting schedule to cause its length to at least equal said first minimum value, cutting said remainder portion in accordance with said second cutting schedule;
(h) in the event that the calculation of step (f) indicates that it is not possible to define a second cutting schedule which will leave sufficient additional material on said tail end section to cause the length of said tail end section to at least equal said first minimum value, executing a scrap routine for cutting said remainder.

3. The method of claim 2, further comprising the steps of:
(a) monitoring the actual length of a section cut in accordance with said second cutting schedule;
(b) determining whether said monitored length is within a predetermined increment of the length specified for that section in said second cutting schedule, and,
(c) in the event that said length of said section is not within said increment of said length specified in said second cutting schedule, repeating steps (c) through (h) of said method as defined in claim 2.

4. The method of claim 2, wherein said scrap routine comprises the steps of:
(a) cutting the entirety of said remainder portion in accordance with a third cutting schedule in which all sections of said remainder cut prior to said tail end section are cut to a length substantially equal to said first maximum value, and
(b) scrapping said tail end section.

5. The method of claim 2, for use in connection with a material handling line being capable of handling only material sections having a length between a second minimum value and a second maximum value, said scrap routine comprising the steps of:
(a) calculating whether, in the event that the entireity of said remainder prior to said tail end section is cut in accordance with said first cutting schedule, said tail end section will have a length at least equal to said second minimum value;
(b) in the event that the calculation of step (a) indicates that said tail end section will have a length at least equal to said second minimum value, cutting said remainder in accordance with a fourth cutting schedule, wherein said remainder is cut to cause the length of said tail end section to most nearly as possible equal said second minimum value, and
(c) in the event that the calculation of step (a) indicates that said tail end section length will be less than said second minimum value, executing a further scrap routine.

6. The method of claim 5, wherein said further scrap routine comprises the steps of:
(a) calculating whether the combined length of said tail end section and the length of a penultimate section immediately preceding said tail end section, cut in accordance with said first cutting schedule, is less than or equal to said second predetermined maximum;
(b) in the event that the calculation of step (a) indicates that said combined length is less than or equal to said second predetermined maximum, cutting said remainder in accordance with a fifth cutting schedule, wherein each remainder section is cut to a length substantially equal to said first maximum value, but refraining from cutting said tail end section from said penultimate section, and
(c) in the event that the calculation of step (a) indicates that said combined length exceeds said second maximum value, determining whether a sixth cutting schedule exists wherein the length of one or more cut sections of said remainder can be altered from said first cutting schedule to cause said combined length to be reduced to a value less than or equal to said second maximum value;
(d) in the event that the determination of step (c) indicates that a sixth cutting schedule exists wherein said combined length can be reduced to a value less than or equal to said second maximum value, cutting said remainder in accordance with said sixth cutting schedule, and
(e) in the event that the determination of step (c) indicates that no sixth cutting schedule exists which would cause said combined length to be reduced to a value less than or equal to said second maximum value, executing an additional scrap routine.

7. The method of claim 6, wherein said additional scrap routine comprises the steps of:
   (a) establishing a third maximum value;
   (b) calculating whether, in the event that said remainder is cut in accordance with a seventh cutting schedule, into sections substantially equal in length to said third maximum value, said combined length will be reduced to a value less than or equal to said second maximum value;
   (c) in the event that the calculation of step (b) indicates that said combined section length value will be less than or equal to said second maximum value, cutting said remainder in accordance with said seventh cutting schedule, but refraining from cutting said tail end section from said penultimate section, and
   (d) in the event that the calculation of step (b) indicates that said combined length cannot be reduced to a value less than or equal to said second maximum value, cutting said remainder in accordance with said seventh cutting schedule, but refraining from cutting said tail end section from said penultimate section, and
   (e) providing an indication of the need to remove said combined penultimate and tail end section from said material handling line.

8. The method of claim 2, wherein:
   said material comprises pipe and steel from which pipe is formed.

9. The method of claim 2, wherein said cutting apparatus actuating step comprises operating a flying cutter.

10. The method of claim 2, wherein said step of calculating said second cutting schedule comprises:
    calculating section lengths at values which are variable between said first minimum and said first maximum values.

11. A material cutting method comprising the steps of:
    (a) propelling the material relative to and past a cutting apparatus;
    (b) actuating the cutting apparatus to cut a first series of sections of said material in accordance with a first cutting schedule, wherein each of said first series of sections has a length between a first maximum and a first minimum value;
    (c) determining the length of a remainder portion of said material yet to be propelled past the cutting apparatus;
    (d) determining whether there exists a second cutting schedule for adjusting the cut lengths of at least two sections of said remainder which, if executed, will result in said remainder being entirely cut into sections all of which have a length between said first maximum value and said first minimum value, and
    (e) in the event that step (d) determines that such a second cutting schedule exists, cutting said remainder in accordance with said second cutting schedule.

12. The method of claim 11, wherein said step of determining said second cutting schedule comprises:
    specifying a cut length of a segment of said remainder at a value which is variable between said first maximum value and said first minimum value.

13. The method of claim 11, wherein said material comprises pipe.

14. The method of claim 11, further comprising:
    executing a scrap routine in response to a determination in step (d) that no said second cutting schedule exists.

15. The method of claim 14, wherein said scrap routine comprises the steps of:
    (a) cutting said remainder in accordance with a third cutting schedule wherein said remainder is cut into a plurality of sections having a length substantially equal to said first maximum value.

16. The method of claim 11, further comprising the steps of:
    (a) monitoring an actual length of a section cut in accordance with said second cutting schedule;
    (b) determining whether the monitored section length is within a predetermined range of the length for that section as specified by said second cutting schedule;
    (c) in the event that the determination of step (b) is that said section length is outside said predetermined range, repeating steps (d) and (e) of claim 11.

17. The method of claim 11, utilizing a cutting apparatus which, in operation, is capable of movement at variable velocity and in the same direction as said relative movement of said material past said cutting apparatus, said step of determining said remainder length comprising:
    (a) sensing a tail end of said material at a first predetermined location;
    (b) sensing the amount of relative movement of said material subsequent to said tail end location sensing and until said cutting apparatus moves to a second predetermined second location, and
    (c) subtracting from the distance between said first and second predetermined locations the amount of material movement sensed in (b).

18. A material cutting method comprising the steps of:
    (a) propelling said material relative to and past a cutting apparatus;
    (b) actuating the cutting apparatus to cut a first series of sections of said material in accordance with a first cutting schedule, wherein each of said first series of segments has a length between a first maximum value and a first minimum value;
    (c) determining the length of a remainder portion of said material yet to be propelled past said cutting apparatus;
    (d) adjusting said cutting schedule such that cut lengths of each of a plurality of segments of said remainder portion are adjusted with respect to said first cutting schedule in order to minimize the amount of material cut from said remainder having a length not within the range defined by said first maximum value and said first minimum value, and
    (e) cutting said remainder portion in accordance with said adjusted cutting schedule.

19. The method of claim 18, wherein said cutting schedule adjustment step comprises adjusting said plurality of sections cut from said remainder to a length having a value variable between said first maximum value and said first minimum value.

20. A material cutting system comprising:
    (a) a cutting apparatus;
    (b) drive mechanism for propelling the material relative to and past said cutting apparatus;

(c) mechanism and circuitry for actuating the cutting apparatus to cut a first series of sections of said material in accordance with a first cutting schedule, wherein each of said first series of sections cut has a predetermined initial length lying between a first maximum and a first minimum value;

(d) means for determining the length of a remainder portion of said material yet to be propelled past said cutting apparatus, said remainder portion including the tail end of said material;

(e) means for calculating the length of a last tail end section of said material including said tail end of said material which would result if said remainder portion were to be cut in its entirety according to said first cutting schedule;

(f) apparatus and circuitry for, in the event that said calculation by means (e) indicates that said tail end section length will be greater than said first minimum value, cutting said remainder portion in its entirety in accordance with said first cutting schedule;

(g) means for, in the event that the calculation by means (e) indicates that said tail end section length would be less than said first minimum value, calculating whether a plurality of sections of said remainder portion can be cut in accordance with a second cutting schedule, wherein said plurality of sections are each cut shorter than said initial predetermined length but at least equal to said first minimum value, and whether said cutting will leave sufficient additional material on said tail end length such that said tail end section length will at least equal said first minimum value;

(h) apparatus and circuitry for, in the event that the calculation by means (g) indicates that sufficient additional material will be left on said tail end section by execution of said second cutting schedule to cause its length to at least equal said first minimum value, cutting said remainder portion in accordance with said second cutting schedule;

(i) means for, in the event that the calculation by means (f) indicates that it is not possible to define a second cutting schedule which will leave sufficient additional material on said tail end section to cause the length of said tail end section to at least equal said first minimum value, executing a scrap routine for cutting said remainder.

21. The system of claim 20, further comprising:

(a) apparatus and circuitry for monitoring the actual length of a section cut in accordance with said second cutting schedule;

(b) means for determining whether said monitored length is within a predetermined increment of the length specified for that section in said second cutting schedule, and, (c) means for, in the event that said length of said section is not within said increment of said length specified in said second cutting schedule, repeating the operation of means (d) through (i).

22. The system of claim 20, wherein said means for executing said scrap routine comprises:

apparatus and circuitry for cutting the entirety of said remainder portion in accordance with a third cutting schedule in which all sections of said remainder cut prior to said tail end section are cut to a length substantially equal to said first maximum value.

23. The system of claim 20, for use in connection with a material handling line being capable of handling only material sections having a length between a second minimum value and a second maximum value, said means for executing said scrap routine comprising:

(a) means for calculating whether, in the event that the entirety of said remainder prior to said tail end section is cut in accordance with said first cutting schedule, said tail end section will have a length at least equal to said second minimum value;

(b) apparatus and circuitry for cutting said remainder in accordance with a fourth cutting schedule, adjusted from said first cutting schedule, if need be, to assure that said sections are cut to cause the length of said tail end section to approach as nearly as possible said second minimum value, in the event that the calculation by means (a) indicates that said tail end section will have a length at least equal to said second minimum value, and (c) means for executing a further scrap routine in the event that the calculation by means (a) indicates that said tail end section length will be less than said second minimum value.

24. The system of claim 23, wherein said means for executing said further scrap routine comprises:

(a) means for calculating whether the combined length of said tail end section and the length of a penultimate section immediately preceding said tail end section, cut in accordance with said first cutting schedule, is less than or equal to said second predetermined maximum;

(b) apparatus and circuitry for cutting said remainder in accordance with a fifth cutting schedule, wherein each remainder section is cut to section lengths substantially equal to said first maximum value, but refraining from cutting said tail end section from said penultimate section, in the event that the calculation by means (a) indicates that said combined length is less than or equal to said second predetermined maximum, and (c) means for determining whether a sixth cutting schedule exists wherein the length of one or more cut sections of said remainder can be altered from said first cutting schedule to cause said combined length to be reduced to a value less than or equal to said second maximum value, in the event that the calculation by means (a) indicates that said combined length exceeds said second maximum value;

(d) apparatus and circuitry for, in the event that the determination by means (c) indicates that a sixth cutting schedule exists wherein said combined length can be reduced to a value less than or equal to said second maximum value, cutting said remainder in accordance with said sixth cutting schedule, and (e) means for executing an additional scrap routine in the event that the determination by means (c) indicates that no sixth cutting schedule exists which would cause said combined length to be reduced to a value less than or equal to said second maximum value.

25. The system of claim 24, wherein said means for executing said additional scrap routine comprises:

(a) means for establishing a third maximum value;

(b) means for calculating whether, in the event that said remainder is cut in accordance with a seventh cutting schedule, into sections substantially equal in length to said third maximum value, said combined length will be reduced to a value less than or equal to said second maximum value;

(c) apparatus and circuitry for cutting said remainder in accordance with said seventh cutting schedule, but refraining from cutting said tail end section from said penultimate section, in the event that the calculation by means (b) indicates that said combined section length value will be less than or equal to said second maximum value, and (d) apparatus and circuitry for providing an indication of the need to remove said combined penultimate and tail end section from said material handling line, in the event that the calculation by means (b) indicates that said combined length cannot be reduced to a value less than or equal to said second maximum value.

26. The system of claim 20, wherein:
said material comprises pipe.

27. The system of claim 20, wherein said cutting apparatus comprises a flying cutter.

28. The system of claim 20, wherein said means for calculating said second cutting schedule comprises:
means for calculating section lengths at values which are variable between said first minimum and said first maximum values.

29. A material cutting system comprising:
(a) a cutting apparatus;
(b) apparatus for propelling the material relative to and past said cutting apparatus;
(c) apparatus and circuitry for actuating said cutting apparatus to cut a first series of sections of said material in accordance with a first cutting schedule, wherein each of said first series of segments has a length between a first maximum value and a first minimum value;
(d) means for determining the length of a remainder portion of said material yet to be propelled past said cutting apparatus;
(e) means for determining whether there exists a second cutting schedule adjusting the cut lengths of at least two sections of said remainder which, if executed, will result in said remainder being cut into sections all of which have a length between said first maximum value and said first minimum value;
(f) in the event that means (e) determines that such a second cutting schedule exists, cutting said remainder in accordance with said second cutting schedule.

30. The system of claim 29, wherein said means for determining said second cutting schedule comprises:
means for specifying a cut length of a segment of said remainder at a value which is variable between said first maximum value and said first minimum value.

31. The system of claim 29, wherein said material comprises pipe.

32. The system of claim 29, further comprising:
means for executing a scrap routine in response to a determination by means (e) that no said second cutting schedule exists.

33. The method of claim 32, wherein said means for executing said scrap routine comprises:

apparatus and circuitry for cutting said remainder in accordance with a third cutting schedule wherein said remainder is cut into a plurality of sections having a length substantially equal to said first maximum value.

34. The system of claim 29, further comprising:
(a) apparatus and circuitry for monitoring an actual length of a section cut in accordance with said second cutting schedule;
(b) means for determining whether the monitored section length is within a predetermined range of the length for that section specified by said second cutting schedule;
(c) means for, in the event that the determination by means (b) of this claim is that said section length is outside said predetermined range as defined by said second cutting schedule, reactuating means (d) and (e) of claim 29.

35. The system of claim 29, including a cutting apparatus which, in operation, is capable of movement at variable velocity and in the same direction as said relative movement of said material past said cutting apparatus, said means for determining said remainder length comprising:
(a) apparatus and circuitry for sensing movement of the tail end of said material past a first predetermined location;
(b) means for sensing the amount of relative movement of said material subsequent to said tail end first location sensing and until said cutting apparatus moves to a predetermined second location, and
(c) means for subtracting from the distance between said first and second predetermined locations the amount of material movement sensed by means (b).

36. A material cutting apparatus comprising:
(a) a cutting apparatus;
(b) apparatus for propelling said material relative to and along a path past said cutting apparatus;
(c) apparatus for actuating said cutting apparatus to cut a first series of sections of said material in accordance with a first cutting schedule, wherein each of said first series of segments has a length between a first maximum value and a first minimum value;
(d) apparatus and circuitry for determining the length of a remainder portion of said material yet to be propelled past said cutting apparatus;
(e) means for adjusting said cutting schedule such that cut lengths of each of a plurality of segments of said remainder portion are adjusted with respect to said first cutting schedule in order to minimize the amount of material cut from said remainder having a length not within the range defined by said first maximum value and said first minimum value, and
(f) means for cutting said remainder portion in accordance with said adjusted cutting schedule.

37. The system of claim 36, wherein said cutting schedule adjustment means comprises means for adjusting each of the lengths of said plurality of sections cut from said remainder to a length having a value variable between said first maximum value and said first minimum value.

* * * * *